2,744,055

TREATMENT OF HYDROCARBON DISTILLATES WITH A PHENYLENE DIAMINE, AN ALKYL PHENOLATE AND AIR

Francis C. Moriarty, Birmingham, Mich., and Francis G. Graves, deceased, late of Carmel, Calif., by Elizabeth Bruner Graves, executrix, Carmel, Calif., assignors of one-half to Universal Oil Products Company, Chicago, Ill., a corporation of Delaware, and one-half to California Research Corporation, San Francisco, Calif., a corporation of Delaware No Drawing. Application January 23, 1952, Serial No. 267,934

10 Claims. (Cl. 196—29)

This invention relates to the treatment of hydrocarbon distillates and more particularly to a novel method of accelerating sweetening of hydrocarbon distillates.

It has been known that sweetening of hydrocarbon distillates and particularly gasoline is accelerated by the addition of a phenylene diamine compound. Because the phenylene diamine compound also serves as an oxidation inhibitor, this process is referred to as "inhibitor sweetening." However, it has been found that in some cases inhibitor sweetening will not occur and in other cases the sweetening will not occur within a sufficiently short time to be a practical refinery operation. For example, in some cases the gasoline does not become sweet in storage for several days or more. Due to shortage of storage capacity or in order to comply with shipping schedules or for other reasons, it is often necessary to transport or use the gasoline promptly, and the refiner cannot afford to wait until sufficient time has passed for the gasoline to become sweet. The present invention is directed to a novel method of accelerating the inhibitor sweetening reaction.

We have discovered that the inhibitor sweetening reaction is accelerated by the presence of sodium phenolates. As used in the present specifications and claims, reference to sodium phenolates is intended to mean the sodium salts of phenolic compounds, including sodium phenolate, sodium cresolate, sodium xylenolate, etc. or mixtures thereof. Such mixtures may be readily recovered from caustic solutions used to treat hydrocarbon distillates containing mercaptans, phenols, cresols, xylenols, etc. The caustic solution containing these ingredients is generally regenerated to decompose the sodium mercaptides and eventually leave a used caustic solution containing the sodium phenolate, cresolates, xylenolates, etc. It is understood that such sodium salts may be prepared synthetically, when desired, by the reaction of caustic and phenol, cresol, xylenol, etc. or mixtures thereof.

In one embodiment the present invention relates to the process of sweetening a sour hydrocarbon distillate which comprises treating said distillate with a phenylene diamine compound in the presence of a sodium phenolate and air.

In a specific embodiment the present invention relates to the process of sweetening sour cracked gasoline which comprises forming a solution of N,N'-di-secondary-butyl-p-phenylene diamine, sodium phenolate and alcohol, and intimately dispersing the resultant solution in said cracked gasoline in the presence of air.

As hereinbefore set forth, an essential feature of the present invention is the use of sodium phenolates in the reaction mixture to accelerate sweetening of sour hydrocarbon distillates. The sodium phenolates appear to exert a unique influence on the inhibitor sweetening reaction. As will be shown by the data in the following examples, improved results are obtained by the use of sodium phenolates as compared, for example, to the use of sodium hydroxide. Thus, it appears that the sodium phenolates possess unexpected properties in effecting these improved results.

The inhibitor sweetening reaction is effected by contacting a sour hydrocarbon distillate with a phenylene diamine compound in the presence of air and the sodium phenolate. N,N'-di-secondary-butyl-p-phenylene diamine is the preferred phenylene diamine compound for use in accordance with the present invention. Other suitable phenylene diamine compounds include N,N'-di-iso-propyl-p-phenylene diamine, N,N'-di-secondary-amyl-p-phenylene diamine, N-isopropyl-N'-secondary-butyl-p-phenylene diamine, N-isopropyl-N'-secondary-amyl-p-phenylene diamine, N-secondary-butyl-N'-secondary-amyl-p-phenylene diamine, etc. It is understood that other substituted p-phenylene diamines in which one or more alkyl radicals are substituted for the amino hydrogens or are attached to the phenyl rings, these alkyl radicals being the same or different, are comprised within the scope of the present invention but are not necessarily equivalent.

The phenylene diamine compound is generally utilized in a concentration of from about 0.0001% to about 1.0% by weight of the hydrocarbon distillate and preferably of from about 0.001% to about 0.1% by weight. The sodium phenolate will be used in an amount sufficient to effect the improved results. In one method of specifying the amount of sodium phenolate to be employed, the alkalinity provided thereby and as determined by conventional titration methods should be at least about one pound per 1000 barrels of hydrocarbon distillate. Stated otherwise, the concentration of sodium phenolate preferably is within the range of from about 0.0025% to 0.1% or more. Higher concentrations of the sodium phenolate generally are not objectionable, although no increased benefits appear to result in the use of an excess thereof above the range hereinbefore set forth.

As hereinbefore set forth, the sodium phenolate solution for use in accordance with the present invention may comprise a regenerated caustic solution which previously had been used to treat gasoline or other hydrocarbon distillates containing phenolic compounds in a concentration sufficient to provide a sodium phenolate concentration as specified in the previous paragraph. These regenerated caustic solutions contain free sodium hydroxide, in addition to the sodium phenolates. In general it is preferred to use these or other solutions containing sodium hydroxide along with the specified concentration of sodium phenolates for effecting sweetening of sour hydrocarbon distillates in accordance with the present invention. The concentration of sodium hydroxide in the solution may range from about 1% to 40% or more by weight of the solution containing the sodium phenolates and preferably is within the range of from about 3% to about 25% thereof.

Because the inhibitor sweetening reaction includes the conversion of mercaptans to disulfides, presumably through an oxidation reaction, it is also essential that air be present in the reaction zone. The amount of air required should be sufficient to effect the desired oxidation reaction. In most cases air dissolved or entrained in the gasoline through the normal course of refining and transporting the gasoline will be sufficient to effect the desired oxidation reaction. In other cases it may be necessary to introduce air from an extraneous source, particularly when the gasoline is stored in tanks having floating roofs which serve to exclude air. It is understood that oxygen or other oxygen-containing gases may be used in place of air.

The process of the present invention is readily effected at atmospheric temperatures, which generally range from about 50° to about 90° F. However, in some cases it may be desirable to employ higher temperatures which may range up to about 125° F.

The process may be effected in any suitable manner whereby the hydrocarbon distillate is contacted with the other components. In one method the phenylene diamine compound and sodium phenolate may be added to the hydrocarbon distillate containing air, and the resultant mixture supplied to a storage tank which preferably is equipped with suitable stirring means to obtain intimate mixing therein. In another method the mixed components may be passed through a suitable mixing device, such as duriron mixers, orifice mixers, etc., and then supplied to a storage tank. When sufficient air is not contained in the gasoline, the air may be introduced along with the gasoline, phenylene diamine compound and/or the sodium phenolate, or the air may be introduced directly to the storage tank. In some cases the air may be utilized as a means of intimately mixing these components.

In a preferred method, a solution is made of the phenylene diamine compound, sodium phenolate and a suitable solvent, and this solution then is commingled with the hydrocarbon distillate containing air. The resultant mixture may be passed through a suitable mixer and the resultant dispersion then may be introduced into a storage tank. It has been found that this particular method is especially suitable because the resultant dispersion in the storage tank settles out to leave a sweet gasoline within a short time and at the same time the sodium compound settles to the bottom of the storage tank. Any suitable solvent may be used for this purpose including alcohols, ketones, ethers, etc. A particularly preferred solvent comprises an alcohol including methyl alcohol, ethyl alcohol, propyl alcohol, etc.

The following examples are introduced to illustrate further the novelty and utility of the present invention but not with the intention of unduly limiting the same.

Example I

The gasoline used in this example was a thermally cracked Pennsylvania gasoline having an A. P. I. gravity at 60° F. of approximately 62.3° and a mercaptan sulfur content of 0.025% by weight.

When a sample of this gasoline was stored in the presence of air but without the phenylene diamine compound and the sodium phenolate, this gasoline sample had a mercaptan sulfur content of 0.018% after about 5 days in storage.

To another sample of this gasoline 0.01% by weight of N,N'-di-secondary-butyl-p-phenylene diamine was added. After about 5 days in storage, this gasoline sample had a mercaptan sulfur content of 0.015% by weight. It is thus seen that the addition of the phenylene diamine compound to the gasoline slightly reduced the mercaptan content but the gasoline still was far from sweet.

Another sample of this gasoline was treated with a sodium phenolate solution analyzing 34% by weight of phenols. This gasoline sample had a mercaptan sulfur content of 0.0175 after about 5 days in storage.

To another sample of the gasoline containing sodium phenolate, 0.01% by weight of N,N'-di-secondary-butyl-p-phenylene diamine was added. This sample became sweet in storage (substantially no mercaptans present) in less than 3 days.

In contrast to the results reported in the previous paragraph, another sample of this gasoline was treated in a similar manner as reported above but using fresh 30° Baumé caustic instead of the sodium phenolate. This gasoline required nearly 5 days to become sweet.

It is thus seen that the use of the sodium phenolates in accordance with the present invention resulted in better than a 40% reduction in the time required for the gasoline to become sweet. As hereinbefore set forth, this time element is of extreme importance to the refiner and a reduction of this order represents a major advantage to him.

Example II

The gasoline used in this example comprised a polymer gasoline having a mercaptan content of 0.025% by weight.

A sample of this gasoline when stored in the presence of air had a mercaptan sulfur content of 0.0225% by weight of mercaptan sulfur after 4½ days in storage. The addition of 0.01% by weight of N,N'-di-secondary-butyl-p-phenylene diamine to another sample of this gasoline resulted in a mercaptan sulfur content of 0.0195% after 4½ days in storage.

When another sample of this gasoline was treated with 0.01% by weight of N,N'-di-secondary-butyl-p-phenylene diamine and the sodium phenolate described in the previous example, the gasoline sample became sweet in storage in about 2 days.

Example III

The charge used in this example was a C$_5$-C$_8$ fraction of a thermally cracked gasoline having a residual mercaptan sulfur content of 0.011% by weight following a mercaptan extraction process. A solution was prepared to consist of the following: (1) 40% by volume of N,N'-di-secondary-butyl-p-phenylene diamine, (2) 20% by volume of sodium phenolates having a phenolic content of 55–60% by volume and (3) 40% by volume of denatured alcohol. This solution was commingled with the C$_5$-C$_8$ charge and the resultant mixture was intimately mixed in a duriron mixer and then introduced into a storage tank. The gasoline became sweet in less than 24 hours.

Example IV

The gasoline used in this example was a catalytically cracked California gasoline having a mercaptan sulfur content of 0.008% by weight.

The gasoline was treated as follows: 10% by volume of about 20° Bé. caustic solution containing approximately 25% sodium cresylate was mixed with the gasoline and allowed to settle. The gasoline phase was found to contain 0.0064 weight per cent sodium as sodium hydroxide and sodium cresylate, the sodium phenolate predominating because of its higher solubility in gasoline than the solubility of sodium hydroxide in gasoline. To one sample of this latter gasoline was added 0.006 weight per cent of N,N'-di-secondary-butyl-p-phenylene diamine, and this mixture was stored in brown quart bottles which were stoppered with corks notched to permit air entry. After 16 hours the gasoline was sweet; that is, the Doctor test was negative.

Another sample of the caustic cresylate-treated gasoline was similarly stored for 16 hours without the addition of the diamine and it was found to have the same mercaptan content as it had before storage.

We claim as our invention:

1. The process of sweetening a sour hydrocarbon distillate which comprises treating said distillate with a phenylene diamine compound in the presence of a sodium phenolate and air.

2. The process of sweetening a sour cracked distillate which comprises treating said distillate with a phenylene diamine compound in the presence of a sodium phenolate and air.

3. The process of sweetening sour cracked gasoline which comprises treating said gasoline with N,N'-di-secondary-butyl-p-phenylene diamine, sodium phenolate and air.

4. The process of sweetening sour cracked gasoline which comprises treating said gasoline with N,N'-di-secondary-butyl-p-phenylene diamine, sodium phenolate, sodium hydroxide and air.

5. The process of sweetening a sour hydrocarbon distillate which comprises forming a solution of a phenylene diamine, sodium phenolate and solvent, and intimately dispersing the resultant solution in said distillate in the presence of air.

6. The process of sweetening a sour hydrocarbon distillate which comprises forming a solution of a phenylene diamine, sodium phenolate, sodium hydroxide and solvent, and intimately dispersing the resultant solution in said distillate in the presence of air.

7. The process of sweetening sour cracked gasoline which comprises forming a solution of N,N'-di-secondary-butyl-p-phenylene diamine, sodium phenolate and denatured alcohol, and intimately dispersing the resultant solution in said gasoline in the presence of air at a temperature of from about 50° to about 125° F.

8. The process of sweetening sour cracked gasoline which comprises forming a solution of N,N'-di-secondary-butyl-p-phenylene diamine, sodium phenolate, sodium hydroxide and denatured alcohol, and intimately dispersing the resultant solution in said gasoline in the presence of air at a temperature of from about 50° to about 125° F.

9. The process of sweetening sour cracked gasoline which comprises contacting said gasoline in the presence of air with at least 0.0001% by weight of N,N'-di-secondary-butyl-p-phenylene diamine and at least 0.0025% by weight of sodium phenolate at a temperature of from about 50° to about 125° F.

10. The process of sweetening sour cracked gasoline which comprises contacting said gasoline in the presence of air with from about 0.001% to about 0.1% by weight of N,N'-di-secondary-butyl-p-phenylene diamine and from about 0.0025% to about 0.1% by weight of sodium phenolate at a temperature of from about 50° to about 125° F.

References Cited in the file of this patent

UNITED STATES PATENTS

| | | |
|---|---|---|
| 2,508,817 | Devol et al. | May 23, 1950 |
| 2,552,399 | Browder | May 8, 1951 |
| 2,616,831 | Rosenwald | Nov. 4, 1952 |
| 2,616,833 | Chenicek et al. | Nov. 4, 1952 |

OTHER REFERENCES

Rosenwald: Pet. Processing 6, 969–973, September 1951.